(No Model.) 2 Sheets—Sheet 1.

F. A. HUNTINGTON.
CRUSHING MILL.

No. 468,544. Patented Feb. 9, 1892.

(No Model.) 2 Sheets—Sheet 2.

F. A. HUNTINGTON.
CRUSHING MILL.

No. 468,544. Patented Feb. 9, 1892.

Witnesses,

Inventor,
Frank A. Huntington
By Dewey & Co.
Attys.

THE NORRIS PETERS CO., PHOTO-LITHO., WASHINGTON, D. C.

UNITED STATES PATENT OFFICE.

FRANK A. HUNTINGTON, OF SAN FRANCISCO, CALIFORNIA.

CRUSHING-MILL.

SPECIFICATION forming part of Letters Patent No. 468,544, dated February 9, 1892.

Application filed May 12, 1891. Serial No. 392,491. (No model.)

*To all whom it may concern:*

Be it known that I, FRANK A. HUNTINGTON, a citizen of the United States, residing at Oakland, Alameda county, State of California, have invented an Improvement in Crushing-Mills; and I hereby declare the following to be a full, clear, and exact description of the same.

My invention relates to that class of crush-mills in which swinging rollers are revolved within a pan and are swung outwardly by centrifugal force against an encircling ring-die.

My invention consists, in connection with a pan and rollers therein, of means for imparting to said rollers a positive axially-rotary motion, whereby the rollers, by contact with the pan, are caused to travel around therein.

It also consists in the novel constructions and combinations hereinafter fully described, and specifically pointed out in the claims.

The object of my invention is to avoid any tendency of the rollers to slip, and thus to prevent unequal wear upon the surfaces of their shoes. This object is attained by the positive rotary motion imparted to the rollers, whereby they cannot slip against the ring-die or the mass of ore between them and the die, but are made to rotate under all circumstances.

Figure 1:
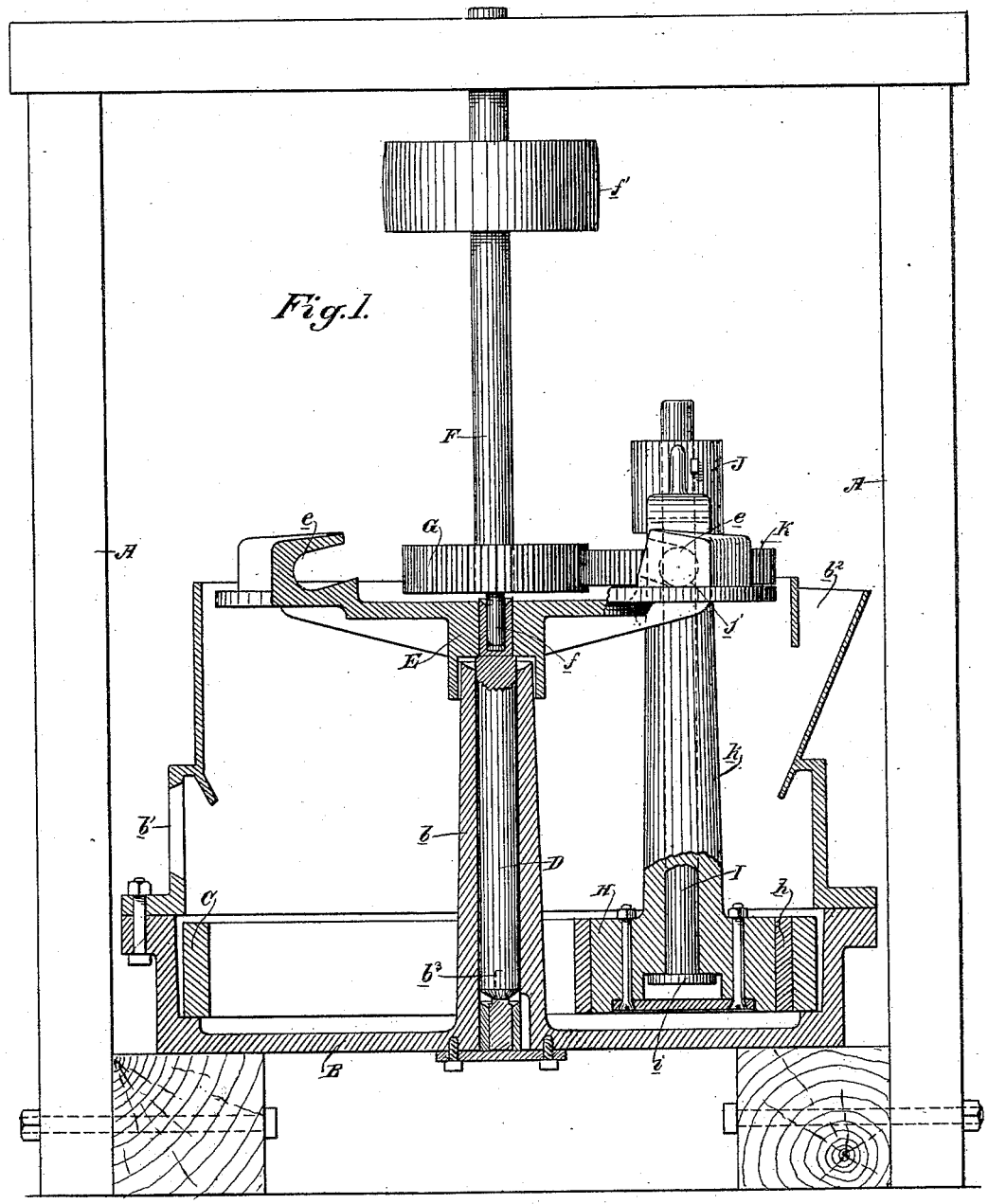
Figure 2:
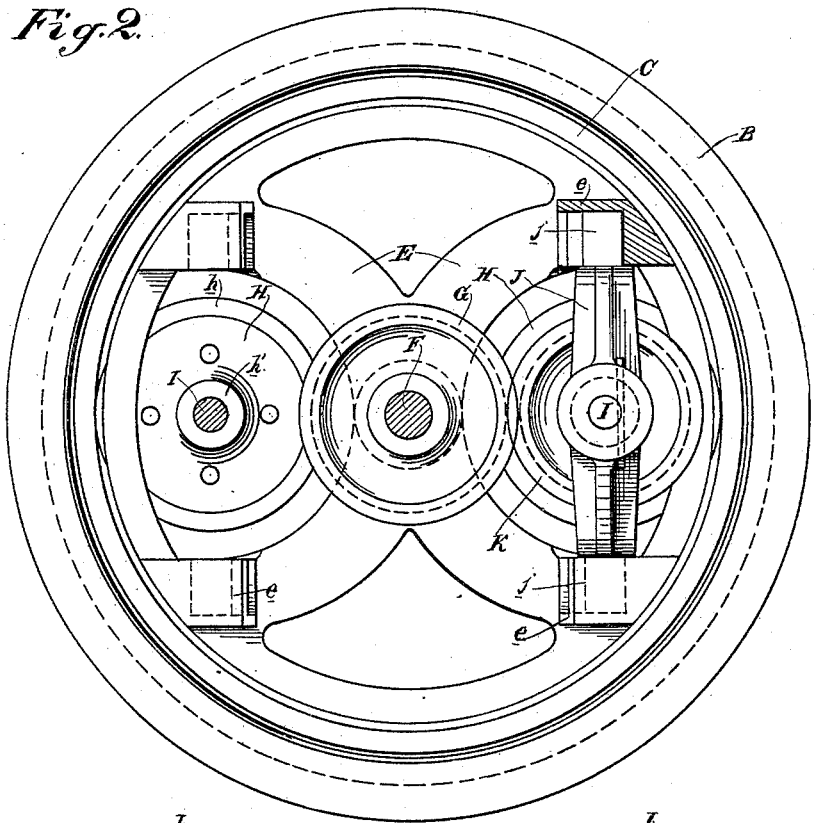
Figure 3:
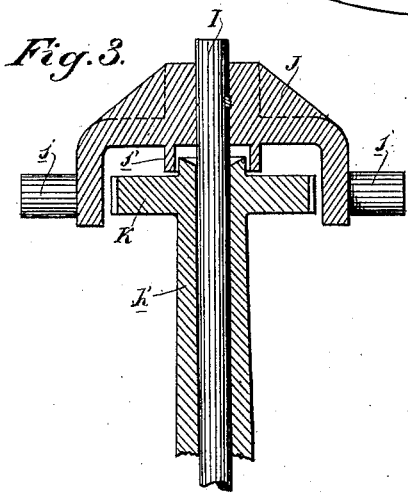
Figure 4:
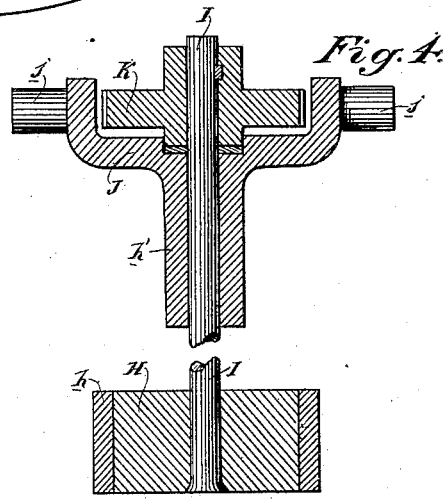

Referring to the accompanying drawings for a more complete explanation of my invention, Figure 1 is a vertical section of my mill. Fig. 2 is a plan of the same. Fig. 3 is a detail showing the suspension of one of the roller-stems. Fig. 4 is a detail showing likewise the suspension of one of the stems, but differing from Fig. 3 in that the roller turns with the stem instead of on it, as in Figs. 3 and 1.

A is a frame-work, upon the base of which is mounted the pan B, having the usual cone center $b$, and the usual sides provided with the screen-opening $b'$ and the feed-inlet $b^2$. Within the pan is the ring-die C, against which the rollers operate. In the cone center $b$ is mounted and adapted to rotate a shaft D, the lower end of said shaft being suitably journaled or stepped upon a pin $b^3$ in the lower end of the cone center. Firmly secured to the upper end of the shaft D is the frame or spider E, having the bearings $e$ in the extremities of its arms. Pivoted by a pin $f$ in the upper end of shaft D is a separate power-shaft F, having a pulley $f'$ or other means by which it is driven. Upon the lower end of shaft F is a gear G.

H are the rollers having the usual shoes $h$ and the upwardly-extending sleeves $h'$. There may be one or more rollers in the mill. The roller is suspended and is adapted to turn upon a stem I, extending upwardly through the sleeve and having a head $i$ on its lower end fitting in a socket in the roller and suspending said roller. The stem I extends upwardly through the sleeve $h'$ of the roller, and, as shown in Fig. 3, it is firmly keyed in a hanger J, having side pins $j$, which are mounted and adapted to rock in the bearings $e$ in the extremities of the arms of the frame or spider E. A flange $j'$ extends downwardly from the center of the hanger J and overlaps the upper end of the sleeve $h'$, its purpose being to prevent foreign matter from getting into the bearing or journal of said sleeve. Upon the upper end of the sleeve $h'$ is a pinion K, which meshes with the gear G.

In Fig. 4 is shown the roller H as being firmly fixed to a stem I, the upper end of said stem being journaled in a hanger J, having end pins $j$, as before. Upon the upper end of the stem is the gear K to mesh with the gear G, and said stem is suspended from the hanger, as shown. This construction shown in Fig. 4 shows and involves the same idea as that of Fig. 3, with the exception that by reason of the change in having the roller rotate with the stem instead of on it its suspension from the hanger is slightly modified.

The operation of the machine is as follows: The shaft F is independent of the shaft D, and has an independent rotation imparted to it by power transmitted to the pulley $f'$. The rotation of the shaft F effects, through the gear G and the pinions K, the axial rotation of the rollers H, and these rollers being swinging ones are thrown outwardly against the ring-die C of the pan. This contact of the rollers and die, the former axially rotating, effects the travel of said rollers around the pan, this movement or travel being permitted by the turning of the frame E, from which they are suspended, said frame turning with the shaft D as a center. In this operation the axial or primary rotation of the rollers is a positive one and is due to the direct gearing connection between them and the power-shaft F. Their revolution about the pan as a body is a secondary movement and is due to the contact of said rollers with the ring-die in the pan. Consequently this positive rotation of the rollers avoids any possibility of said rollers slipping on their contact with the ring-die or with an uneven mass of ore and prevents any tendency to uneven wearing of their shoes.

In my previous roller-mills the rollers are carried around the pan bodily by means of a driver, from which they are suspended, said driver receiving a positive rotary motion, and the axial rotation of the rollers is due to their contact with the ring-die. My present machine is the reverse of this in operation in that the axial or primary rotation of the rollers is a positive one, while their revolution or travel as a body about the pan is due to their contact with the ring-die.

As shown in Fig 2, there is little friction to be encountered, as the rotation or travel of the rollers about the pan is in the same direction as the revolution of the gear G, which gives to them their axial rotation.

Having thus described my invention, what I claim as new, and desire to secure by Letters Patent, is—

1. In a crushing-mill, the combination of a pan, an axially-rotary frame, axially-rotary rollers carried by said frame, and means for imparting to said rollers a positive axial rotation, whereby through their contact with the pan they are carried around said pan with their rotary frame, substantially as herein described.

2. In a crushing-mill, the combination of a pan, an axially-rotary frame mounted therein, axially-rotary rollers suspended from the frame by a hinged connection, whereby they can swing outwardly against the pan, and means for imparting to said rollers an axially-rotary motion, whereby through their contact with the pan they are caused to travel around therein with their rotary frame, substantially as herein described.

3. In a crushing-mill, the combination of a pan and axially-rotary frame mounted therein, rollers having stems suspended from the frame, a power-shaft, a gear on the power-shaft, and pinions on the roller connections, whereby the rollers are axially rotated and by their contact with the pan are caused to travel around therein, substantially as herein described.

4. In a crushing-mill, the combination of the pan, an axially-rotary frame mounted therein, rollers adapted to operate against the pan, stems for said rollers, hangers for suspending said stems, a pivotal connection between said hangers and the frame, whereby the rollers may swing outwardly against the pan, a power-shaft, and gearing between the power-shaft and the roller connections, whereby the latter are axially rotated and by their contact with the pan are caused to travel around therein, substantially as herein described.

5. In a crushing-mill, the combination of a pan, an axially-rotary frame mounted therein, rollers having sleeves, stems upon which said rollers are suspended and turn, hangers pivoted in the frame and with which the stems are connected, pinions upon the sleeves of the rollers, a power-shaft, and a gear thereon meshing with said pinions, substantially as herein described.

6. In a crushing-mill, the combination of the axially-rotary rollers having the sleeves, the stems extending through said sleeves, the hangers suspending the stems, and the downwardly-extending flange of the hangers overlapping the upper ends of the sleeves, substantially as herein described.

7. In a crushing-mill, the combination of the pan having the cone center, the rotary shaft therein having the frame upon its top, the rollers having stems and hangers suspending said stems from the frame by a hinge connection, whereby the rollers can swing outwardly against the pan, a power-shaft pivoted in the upper end of the frame-shaft, a gear on the power-shaft, and pinions on the roller-stems meshing with said gear, whereby said rollers are axially rotated and by their contact with the pan are caused to travel around therein, substantially as herein described.

In witness whereof I have hereunto set my hand.

FRANK A. HUNTINGTON.

Witnesses:
S. H. NOURSE,
H. F. ASCHECK.